United States Patent [19]

Swan et al.

[11] Patent Number: 5,211,866
[45] Date of Patent: May 18, 1993

[54] AZEOTROPE-LIKE COMPOSITIONS OF 1-CHLORO-3,3,3-TRIFLUOROPROPANE AND ISOPROPANOL

[75] Inventors: Ellen L. Swan, Ransomville; Rajat S. Basu, Williamsville; Richard M. Hollister, Buffalo, all of N.Y.

[73] Assignee: Allied-Signal Inc., Morris Township, Morris County, N.J.

[21] Appl. No.: 799,511

[22] Filed: Nov. 26, 1991

[51] Int. Cl.$^5$ .......................... C09K 3/30; C09K 5/04; C11D 7/30; C23G 5/028

[52] U.S. Cl. .......................... 252/67; 62/114; 134/12; 134/31; 134/38; 134/40; 134/42; 252/162; 252/170; 252/171; 252/305; 252/364; 252/DIG. 9

[58] Field of Search .................. 252/67, 162, 170, 171, 252/172, 305, 364, DIG. 9; 62/114; 134/21, 31, 38, 40, 42, 12

[56] References Cited

U.S. PATENT DOCUMENTS

| | | | |
|---|---|---|---|
| 2,683,093 | 7/1954 | Eberl | 252/364 |
| 3,725,317 | 4/1973 | Ronden et al. | 260/2.5 E |
| 4,795,763 | 1/1989 | Gluck et al. | 521/99 |
| 5,034,149 | 3/1990 | Merchant | 252/171 |
| 5,066,418 | 11/1991 | Merchant | 252/172 |
| 5,152,845 | 10/1992 | Li | 134/40 |
| 5,158,617 | 10/1992 | Li | 134/40 |

FOREIGN PATENT DOCUMENTS

| | | | |
|---|---|---|---|
| 1-304194 | 12/1989 | Japan . | |
| 2-164404 | 6/1990 | Japan . | |
| 2-166185 | 6/1990 | Japan | 252/172 |
| 2-166197 | 6/1990 | Japan | 252/172 |
| 2-166198 | 6/1990 | Japan | 252/172 |
| 2-166199 | 6/1990 | Japan | 252/172 |
| 2-166288 | 6/1990 | Japan | 252/172 |
| 642285 | 1/1979 | U.S.S.R. . | |
| 90/08814 | 8/1990 | World Int. Prop. O. . | |

*Primary Examiner*—Linda Skaling
*Attorney, Agent, or Firm*—Colleen D. Szuch; Jay P. Friedenson

[57] ABSTRACT

Azeotrope-like compositions of 1-chloro-3,3,3-trifluoropropane and isopropanol have been discovered which are useful in a variety of applications including industrial cleaning, refrigerant and aerosol applications.

10 Claims, No Drawings

AZEOTROPE-LIKE COMPOSITIONS OF 1-CHLORO-3,3,3-TRIFLUOROPROPANE AND ISOPROPANOL

FIELD OF THE INVENTION

This invention relates to azeotrope-like mixtures of 1-chloro-3,3,3-trifluoropropane (HCFC-253eb) and isopropanol. These mixtures are useful in a variety of applications including industrial cleaning, refrigerant, blowing agent and aerosol applications.

BACKGROUND OF THE INVENTION

Fluorocarbon based solvents have been used extensively for the degreasing and otherwise cleaning of solid surfaces, especially intricate parts and difficult to remove soils.

In its simplest form, vapor degreasing or solvent cleaning consists of exposing a room temperature object to be cleaned to the vapors of a boiling solvent. Vapors condensing on the object provide clean distilled solvent to wash away grease or other contamination. Final evaporation of solvent from the object leaves the object free of residue. This is contrasted with liquid solvents which leave deposits on the object after rinsing.

A vapor degreaser is used for difficult to remove soils where elevated temperature is necessary to improve the cleaning action of the solvent, or for large volume assembly line operations where the cleaning of metal parts and assemblies must be done efficiently. The conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing.

Vapor degreasers suitable in the above-described operations are well known in the art. For example, Sherliker et al. in U.S. Pat. No. 3,085,918 disclose such suitable vapor degreasers comprising a boiling sump, a clean sump, a water separator, and other ancillary equipment.

Cold cleaning is another application where a number of solvents are used. In most cold cleaning applications, the soiled part is either immersed in the fluid or wiped with cloths soaked in solvents and allowed to air dry.

Recently, nontoxic nonflammable fluorocarbon solvents like trichlorotrifluoroethane, have been used extensively in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts, etc.

The art has looked towards azeotropic compositions having fluorocarbon components because the fluorocarbon components contribute additionally desired characteristics, like polar functionality, increased solvency power, and stabilizers. Azeotropic compositions are desired because they do not fractionate upon boiling. This behavior is desirable because in the previously described vapor degreasing equipment with which these solvents are employed, redistilled material is generated for final rinse-cleaning. Thus, the vapor degreasing system acts as a still. Therefore, unless the solvent composition is essentially constant boiling, fractionation will occur and undesirable solvent distribution may act to upset the cleaning and safety of processing. Preferential evaporation of the more volatile components of the solvent mixtures, which would be the case if they were not an azeotrope or azeotrope-like, would result in mixtures with changed compositions which may have less desirable properties, such as lower solvency towards soils, less inertness towards metal, plastic or elastomer components, and increased flammability and toxicity.

Besides being useful in cleaning applications, fluorocarbons have utility as refrigerants in a variety of applications including refrigerators, window and automotive air conditioners and industrial scale cooling. Generally, CFC-11, CFC-12 or CFC-113 have been the refrigerants of choice in these applications.

Azeotropic or azeotrope-like compositions are potentially desirable in the refrigerant art because they do not fractionate upon boiling or evaporation. This behavior is desirable because in the previously described vapor compression equipment with which these refrigerants are employed, condensed material is generated in preparation for cooling or for heating purposes and unless the refrigerant composition is constant boiling, fractionation and segregation will occur upon evaporation and condensation and undesirable refrigerant distribution may act to upset the cooling or heating.

The art is continually seeking new fluorocarbon based azeotropic mixtures or azeotrope-like mixtures which offer alternatives for new and special applications for industrial cleaning, refrigerant and aerosol applications. Currently, fluorocarbon-based azeotrope-like mixtures are of particular interest because they are considered to be stratospherically safe substitutes for presently used fully halogenated chlorofluorocarbons (i.e., e.g., CFC-11, CFC-12, CFC-113). The latter have been implicated in causing environmental problems associated with the depletion of the earth's protective ozone layer. Mathematical models have substantiated that hydrochlorofluorocarbons, like 1-chloro-3,3,3-trifluoropropane, have a much lower ozone depletion potential and global warming potential than the fully halogenated species.

Accordingly, it is an object of the present invention to provide novel environmentally acceptable azeotrope-like compositions which are useful in a variety of applications including industrial cleaning, refrigerant and aerosol applications.

It is another object of this invention to provide azeotrope-like compositions which are liquid at room temperature and which will not fractionate under conditions of use.

Other objects and advantages of the invention will become apparent from the following description.

SUMMARY OF THE INVENTION

The invention relates to novel azeotrope-like compositions which are useful in a variety of applications including industrial cleaning, refrigerant and aerosol applications. Specifically the invention relates to compositions of 1-chloro-3,3,3-trifluoropropane and isopropanol which are essentially constant boiling, environmentally acceptable and which remain liquid at room temperature.

DETAILED DESCRIPTION OF THE INVENTION

In accordance with the invention, novel azeotrope-like compositions of 1-chloro-3,3,3-trifluoropropane (HCFC-253eb) and isopropanol have been discovered wherein the azeotrope-like components of the composition consist of 1-chloro-3,3,3-trifluoropropane and isopropanol.

The HCFC-253eb component of the invention has good solvent properties. Isopropanol also has good solvent capabilities; dissolving-polar organic materials. Thus, when these components are combined in effective amounts, an efficient azeotropic solvent results.

The azeotrope-like compositions of the invention consist essentially of from about 99.9 to about 91.5 weight percent HCFC-253eb and from about 0.1 to about 8.5 weight percent isopropanol and boil at about 44.5° C.±0.4° C. at 760 mm Hg.

Preferably, the azeotrope-like compositions of the invention consist essentially of from about 99.9 to about 92.5 weight percent HCFC-253eb and from about 0.1 to about 7.5 weight percent isopropanol.

In a more preferred embodiment, the azeotrope-like compositions of the invention consist essentially of from about 99.9 to about 93 weight percent HCFC-253eb and from about 0.1 to about 7 weight percent isopropanol.

The precise or true azeotrope compositions have not been determined but have been ascertained to be within the indicated ranges. Regardless of where the true azeotropes lie, all compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at a stated P and T. In practice, this means that the components of a mixture cannot be separated during distillation, and therefore are useful in vapor phase solvent cleaning as described above.

For purposes of this discussion, by azeotrope-like composition is intended to mean that the composition behaves like a true azeotrope in terms of its constant-boiling characteristics or tendency not to fractionate upon boiling or evaporation. Such compositions may or may not be a true azeotrope. Thus, in such compositions, the composition of the vapor formed during boiling or evaporation is identical or substantially identical to the original liquid composition. Hence, during boiling or evaporation, the liquid composition, if it changes at all, changes only minimally. This is contrasted with non-azeotrope-like compositions in which the liquid composition changes substantially during boiling or evaporation.

Thus, one way to determine whether a candidate mixture is "azeotrope-like" within the meaning of this invention, is to distill a sample thereof under conditions (i.e. resolution—number of plates) which would be expected to separate the mixture into its separate components. If the mixture is non-azeotropic or non-azeotrope-like, the mixture will fractionate, i.e., separate into its various components with the lowest boiling component distilling off first, and so on. If the mixture is azeotrope-like, some finite amount of a first distillation cut will be obtained which contains all of the mixture components and which is constant boiling or behaves as a single substance. This phenomenon cannot occur if the mixture is not azeotrope-like, i.e., it is not part of an azeotropic system. If the degree of fractionation of the candidate mixture is unduly great, then a composition closer to the true azeotrope must be selected to minimize fractionation. Of course, upon distillation of an azeotrope-like composition such as in a vapor degreaser, the true azeotrope will form and tend to concentrate. Ebulliometric techniques may also be used to determine azeotropy. Using this technique, the proportions of the components in a composition are varied and their boiling points measured and recorded. Using the maximum and minimum boiling points the azeotrope can be determined. See Example 1.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at different pressures, the composition of a given azeotrope will vary at least slightly as does the boiling point of the composition. Thus, an azeotrope of A and B represents a unique type of relationship but with a variable composition depending on temperature and/or pressure. Accordingly, another way of defining azeotrope-like within the meaning of the invention is to state that mixtures of HCFC-253eb and isopropanol boil within ±0.4° C. (at 760 mm Hg) of about 44.5° C. As is readily understood by persons skilled in the art, the boiling point of the azeotrope will vary with the pressure.

As stated above, the azeotrope-like compositions discussed herein are useful as solvents for various cleaning applications including vapor degreasing, defluxing of printed circuit boards contaminated with flux and flux-residues, cold cleaning, dry cleaning, dewatering, decontamination, spot cleaning, aerosol propelled rework, extraction, particle removal, and surfactant cleaning applications.

Thus, in one process embodiment, the azeotrope-like compositions of the invention may be used to clean solid surfaces like metals, by treating said surfaces with said compositions in any manner well known in the art such as by dipping or spraying or use of conventional degreasing apparatus.

When the present azeotrope-like compositions are used to clean solid surfaces by spraying the surfaces with the compositions, preferably, the azeotrope-like compositions are sprayed onto the surfaces by using a propellant. Preferably, the propellant is selected from the group consisting of hydrocarbons, chlorofluorocarbons, hydrochlorofluorocarbons, hydrofluorocarbons, dimethyl ether, carbon dioxide, nitrogen, nitrous oxide, methylene oxide, air, and mixtures thereof.

Useful hydrocarbon propellants include isobutane, butane, propane, and mixtures thereof; commercially available isobutane, butane, and propane may be used in the present invention. Useful chlorofluorocarbon propellants include trichlorofluoromethane (known in the art as CFC-11), dichlorodifluoromethane (known in the art as CFC-12), 1,1,2-trichloro-1,2,2-trifluoroethane (known in the art as CFC-113), and 1,2-dichloro-1,1,2,2-tetrafluoroethane (known in the art as CFC-114); commercially available CFC-11, CFC-12, CFC-113, and CFC-114 may be used in the present invention.

Useful hydrochlorofluorocarbon propellants include dichlorofluoromethane (known in the art as HCFC-21), chlorodifluoromethane (known in the art as HCFC-22), 1-chloro-1,2,2,2-tetrafluoroethane (known in the art as HCFC-124), 1,1-dichloro-2,2-difluoroethane (known in the art as HCFC-132a), 1-chloro-2,2,2-trifluoroethane (known in the art as HCFC-133), and 1-chloro-1,1-difluoroethane (known in the art as HCFC-142b); commercially available HCFC-21, HCFC-22, and HCFC-142b may be used in the present invention. HCFC-124 may be prepared by a known process such as that taught by U.S. Pat. No. 4,843,181 and HCFC-133 may be prepared by a known process such as that taught by U.S. Pat. No. 3,003,003.

Useful hydrofluorocarbon propellants include trifluoromethane (known in the art as HFC-23), 1,1,1,2-tetrafluoroethane (known in the art as HFC-134a), and 1,1-difluoroethane (known in the art as HFC-152a); commercially available HFC-23 and HFC-152a may be used in the present invention. Until HFC-134a becomes available in commercial quantities, HFC-134a may be prepared by any known method such as that disclosed by U.S. Pat. No. 4,851,595. More preferred propellants include hydrochlorofluorocarbons, hydrofluorocarbons, and mixtures thereof. The most preferred propellants include chlorodifluoromethane and 1,1,1,2-tetrafluoroethane.

In another process embodiment, the azeotrope-like compositions of the invention may be used in method for producing cooling which comprises condensing a refrigerant comprised of the azeotrope-like compositions of the invention and thereafter evaporating the refrigerant in the vicinity of the body to be cooled.

In yet another process embodiment, the azeotrope-like compositions of the invention may be used in a method for producing heating comprising condensing a refrigerant comprised of the azeotrope-like compositions of the invention in the vicinity of the body to be heated and thereafter evaporating the refrigerant.

Aerosol products have employed individual halocarbons as well as halocarbon blends as propellant vapor pressure attenuators, in aerosol systems. Azeotropic mixtures, like those of the invention, with their constant compositions and vapor pressures would be very useful as solvents and propellants in aerosol systems.

The HCFC-253eb and isopropanol components of the invention are known materials. Preferably, they should be used in sufficiently high purity so as to avoid the introduction of adverse influences upon the solvent or constant boiling properties of the system.

Commercially available HCFC-253eb and isopropanol may be used in the present invention. The HCFC-253eb component may be purchased, for example, from PCR Inc., of Gainsville, Fla. or Halocarbon Products Co., of Hackensack, N.J. Alternately, it may be synthesized by reacting commercially available carbon tetrachloride and ethylene at low temperature in the presence of hydrogen fluoride as a catalyst to form 1,1,1,3-tetrachloropropane. The hydrogen fluoride then serves as a fluorination agent to convert the 1,1,1,3-tetrachloropropane to 1-chloro-3,3,3-trifluoropropane.

Inhibitors may be added to the present azeotrope-like compositions to inhibit decomposition of the compositions; react with undesirable decomposition products of the compositions; and/or prevent corrosion of metal surfaces. Any or all of the following classes of inhibitors may be employed in the invention: epoxy compounds such as propylene oxide; nitroalkanes such as nitromethane; ethers such as 1,4-dioxane; unsaturated compounds such as 1,4-butane diol; acetals or ketals such as dipropoxy methane; ketones such as methyl ethyl ketone; alcohols such as tertiary amyl alcohol; esters such as triphenyl phosphite; and amines such as triethyl amine. Other suitable inhibitors will readily occur to those skilled in the art.

Having described the invention in detail and by reference to preferred embodiments thereof, it will be apparent that modifications and variations are possible without departing from the scope of the invention defined in the appended claims.

The present invention is more fully illustrated by the following non-limiting Examples.

EXAMPLE 1

The compositional range over which HCFC-253eb and isopropanol exhibit constant boiling behavior was determined. This was accomplished by charging measured quantities of HCFC-253eb into an ebulliometer. The ebulliometer consisted of a heated sump in which the HCFC-253eb was brought to a boil. The upper part of the ebulliometer connected to the sump was cooled thereby acting as a condenser for the boiling vapors, allowing the system to operate at total reflux. After bringing the HCFC-253eb to a boil at atmospheric pressure, measured amounts (3 cc) of isopropanol were titrated into the ebulliometer. The change in boiling point was measured with a platinum resistance thermometer. The results indicate that compositions of HCFC-253eb and isopropanol ranging from 99.9–91.5/0.1–8.5 weight percent respectively would exhibit constant boiling behavior at about 44.5° C.±0.4° C. at 760 mm Hg.

EXAMPLE 2

Performance studies are conducted to evaluate the solvent properties of the azeotrope-like compositions of the invention. Specifically, metal coupons are cleaned using the azeotrope-like composition of Example 1 as solvent. The metal coupons are soiled with various types of oils and heated to 93° C. so as to partially simulate the temperature attained while machining and grinding in the presence of these oils.

The metal coupons thus treated are degreased in a simulated vapor phase degreaser. Condenser coils are kept around the lip of a cylindrical vessel to condense the solvent vapor which then collects in the vessel. The metal coupons are held in the solvent vapor and rinsed for a period of 15 seconds to 2 minutes depending upon the oils selected.

The cleaning performance of the azeotrope-like compositions is determined by visual observation and by measuring the weight change of the coupons using an analytical balance to determine the total residual materials left after cleaning. The results indicate that the compositions of the invention are effective solvents.

EXAMPLE 3

For the following examples, six-ounce three-piece aerosol cans are used. The azeotrope-like composition of Example 1 is weighed into a tared aerosol can. After purging the can with tetrafluoroethane in order to displace the air within the container, a valve is mechanically crimped onto the can. Liquid chlorodifluoromethane is then added through the valve utilizing pressure burettes.

A printed circuit board having an area of 37.95 square inches and densely populated with dip sockets, resistors, and capacitors is precleaned by rinsing with isopropanol before wave soldering. The board is then fluxed and wave soldered using a Hollis TDL wave solder machine.

The printed circuit board is then spray cleaned using the aerosol can having the azeotrope-like composition therein. The cleanliness of the board is tested visually and also using an Omega-meter which measures the ionic contamination of the board. The results indicate that the azeotrope-like compositions of the invention are effective cleaning agents.

What is claimed is:

1. Azeotrope-like compositions consisting essentially of from about 99.9 to about 91.5 weight percent 1-chloro-3,3,3-trifluoropropane and from about 0.1 to about 8.5 weight percent isopropanol which boil at about 44.5° C. at 760 mm Hg, wherein the azeotrope-like components of the composition consist of 1-chloro-3,3,3-trifluoropropane and isopropanol.

2. The azeotrope-like compositions of claim 1 wherein said compositions of 1-chloro-3,3,3-trifluoropropane and isopropanol boil at 44.5° C.±about 0.4° C. at 760 mm Hg.

3. The azeotrope-like compositions of claim 1 wherein said compositions consist essentially of from about 99.9 to about 92.5 weight percent 1-chloro-3,3,3-trifluoropropane and from about 0.1 to about 7.5 weight percent isopropanol.

4. The azeotrope-like compositions of claim 3 wherein said compositions consist essentially of from about 99.9 to about 93 weight percent 1-chloro-3,3,3-trifluoropropane and from about 0.1 to about 7 weight percent isopropanol.

5. The azeotrope-like compositions of claim 1 wherein an effective amount of an inhibitor is present in said compositions to accomplish at least one of the following functions: to inhibit decomposition of the compositions; react with undesirable decomposition products of the compositions; and prevent corrosion of metal surfaces.

6. The azeotrope-like compositions of claim 5 wherein said inhibitor is selected from the group consisting of epoxy compounds, nitroalkane, acetals, ketals, ketones, esters and amines.

7. A method of cleaning a solid surface comprising treating said surface with an azeotrope-like composition of claim 1.

8. An aerosol composition comprising a propellant and an active agent, wherein the propellant is an azeotrope-like composition of claim 1.

9. A method for producing cooling comprising condensing a refrigerant composition of claim 1 and thereafter evaporating said composition in the vicinity of a body to be cooled.

10. A method for producing heating comprising condensing a refrigerant composition of claim 1 in the vicinity of a body to be heated and thereafter evaporating said composition.

* * * * *